(12) United States Patent
Nakatani et al.

(10) Patent No.: US 7,701,326 B2
(45) Date of Patent: Apr. 20, 2010

(54) TIRE INFORMATION TRANSMITTER AND TIRE INFORMATION ACQUISITION SYSTEM USING THE TRANSMITTER

(75) Inventors: Koji Nakatani, Kanagawa (JP);
Toshimitsu Ebinuma, Kanagawa (JP);
Hideki Nihei, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 2 days.

(21) Appl. No.: 12/033,842

(22) Filed: Feb. 19, 2008

(65) Prior Publication Data

US 2008/0211650 A1    Sep. 4, 2008

Related U.S. Application Data

(63) Continuation of application No. 11/353,795, filed on Feb. 14, 2006, now Pat. No. 7,348,879.

(30) Foreign Application Priority Data

Feb. 15, 2005  (JP) .............................. 2005-037874

(51) Int. Cl.
*B60C 23/00* (2006.01)

(52) U.S. Cl. .................... 340/442; 340/447; 73/146; 73/146.2

(58) Field of Classification Search ................ 340/442, 340/443, 444, 445, 446, 447, 448; 73/146, 73/146.2, 146.3, 146.8; 342/42
See application file for complete search history.

(56) References Cited

U.S. PATENT DOCUMENTS 6,175,301 B1    1/2001  Piesinger (Continued)

FOREIGN PATENT DOCUMENTS

JP    2000-62419 A    2/2000

(Continued)

OTHER PUBLICATIONS

Notification of Reasons for Refusal for Japanese patent application No. 2005-037874 dated Dec. 8, 2009 by Japanese Patent Office.

*Primary Examiner*—Toan N Pham
*Assistant Examiner*—Kerri McNally
(74) *Attorney, Agent, or Firm*—Knobbe Martens Olson and Bear LLP (57) ABSTRACT

A tire information transmitter measures ambient information in a tire cavity region including at least pressure to wirelessly transmit to outside the tire cavity region. The tire transmitter comprises: a sensor unit having a pressure sensor for measuring a pressure in the tire cavity region; a control unit for comparing a level of a pressure signal representing pressure measured by the sensor unit with a threshold value and for generating an operation signal indicating that the tire information transmitter is operating; and a transmitting unit for wirelessly transmitting the pressure signal or the operation signal. The control unit controls the transmitting of the transmitting unit and compares the level of the pressure signal with the threshold value continually after a supply of driving power is started, and has a comparing mode in which the transmitting unit transmits the operation signal at a first time interval, and a transmitting mode in which the transmitting unit transmits the pressure signal at a second time interval which is shorter than the first time interval. Further, the control unit irreversibly shifts from the comparing mode to the transmitting mode, once the level of the pressure signal exceeds the threshold value, as a result of the comparing.

15 Claims, 4 Drawing Sheets

U.S. PATENT DOCUMENTS

| | | | |
|---|---|---|---|
| 6,445,286 B1 * | 9/2002 | Kessler et al. | 340/442 |
| 6,894,600 B2 | 5/2005 | Phelan | |
| 7,075,417 B2 * | 7/2006 | Harada et al. | 340/442 |
| 2002/0113692 A1 | 8/2002 | Normann et al. | |
| 2004/0233049 A1 | 11/2004 | Harada et al. | |

FOREIGN PATENT DOCUMENTS

| | | |
|---|---|---|
| JP | 2002-248914 A | 9/2002 |
| JP | 3385529 B | 1/2003 |
| JP | 2003-508298 A | 3/2003 |

* cited by examiner

TIRE INFORMATION TRANSMITTER AND TIRE INFORMATION ACQUISITION SYSTEM USING THE TRANSMITTER

RELATED APPLICATIONS

This application is a continuation of and claims priority from, under 35 U.S.C. §120, U.S. application Ser. No. 11/353,795, filed Feb. 14, 2006 which is hereby incorporated by reference.

BACKGROUND OF THE INVENTION

1. Field of the Invention

The present invention relates to tire information transmitters which are mounted to vehicles having wheel assemblies, such as trucks, buses, passenger cars and motor-bikes, and transmit ambient information in a tire cavity region, such as, a tire inflation pressure and a tire temperature, and the present invention also relates to tire information acquisition systems using the tire information transmitter. Priority is claimed from JP 2005-37874, the disclosure of which is incorporated herein by reference thereto.

2. Description of the Prior Art

Nowadays there have been proposed tire monitoring systems used in vehicles such as trucks, buses, passenger cars and motor-bikes, that are provided with wheel assemblies each including a wheel and a tire, for constantly monitoring a pressure (hereinafter alternatively referred to as the tire inflation pressure) in the tire cavity region surrounded by a tire internal surface and a wheel wall surface and a temperature (hereinafter alternatively referred to as the tire internal temperature) in the tire cavity region, so that an alert indicating abnormal situation is issued if the tire inflation pressure or the tire internal temperature exceeds a predetermined range.

Generally, in conventional tire information systems, a tire information transmitter is provided in the tire cavity region so as to acquire ambient information in the region and wirelessly transmit the ambient information to outside the tire cavity region.

In the conventional tire monitoring systems, the ambient information is received by a receiver provided in the vicinity of a tire house of the vehicle body, and based on the received ambient information, the presence of any abnormality is determined, so that the driver is alerted to any abnormal situation.

In the tire information transmitter of such conventional tire monitoring systems, the transmission of the ambient information is triggered by radio wave supplied from outside. Alternatively, the transmission of the ambient information is triggered by other known methods including: providing a switching device for switching; providing a lead terminal on the tire information transmitter and short-circuiting using the lead terminal; and applying a predetermined voltage to a lead terminal.

There are still other methods as will be described below that have been proposed for triggering the transmission of signals from the tire information transmitter to outside.

PATENT DOCUMENT 1 ((JP 2000-62419 A) discloses a tire air pressure detection transmitter that measures pressure using a pressure sensor and transmits the data on a predetermined period basis. The tire air pressure detection transmitter according to PATENT DOCUMENT 1 operates in a low power consumption mode until the next measuring cycle starts, if the difference between the pressure data measured in the previous measuring cycle and the pressure data measured in the current measuring cycle is not larger than a predetermined pressure difference value, in order to minimize battery power consumption. Accordingly, the tire air pressure detection transmitter of PATENT DOCUMENT 1 transmits pressure data only when the pressure difference exceeds the predetermined value. This contributes to a longer battery life.

PATENT DOCUMENT 2 (JP2002-248914A) discloses a tire condition monitoring apparatus that controls a transmission circuit to transmit data showing the measured tire condition only when the data showing the latest measured tire condition changes more than a predetermined value. In this way, a transmitter of the tire condition monitoring apparatus according to PATENT DOCUMENT 2 transmits the data showing the tire condition only when the tire condition has changed more than a predetermined value. This also provides a longer battery life.

A tire pressure monitoring system disclosed in PATENT DOCUMENT 3 (JP 3,385,529 B) is driven by battery power to wirelessly transmit a monitoring signal including a tire pressure detection value detected by a sensor to a vehicle body through a transmitting section. The system has a control section that compares the detection value provided by the sensor with a predetermined value to enable the transmitting section to wirelessly transmit the monitoring signal, if the detection value exceeds the predetermined value.

In the tire pressure monitoring system of PATENT DOCUMENT 3, the wireless transmission from the transmitting section is stopped when the detection value provided by the sensor is as low as around atmospheric pressure, thereby suppressing unnecessary power consumption of the battery power.

However, in the conventional tire information transmitters, input of radio wave from outside is necessary in order to activate the transmitter, and thereby a receiving circuit is required, causing the system configuration to be complicated. This in turn increases system cost.

In addition, for the conventional tire information transmitters, input of radio wave from outside is necessary in order to trigger the transmission of ambient information, thereby requiring additional work and time.

Further, in the conventional tire information transmitters, it is necessary to provide a switching device for switching in order to trigger the transmission of ambient information, which requires additional work and time.

In conventional tire information transmitters that are provided with a lead terminal, the transmission is triggered by applying a predetermined voltage to the lead terminal, thereby also requiring additional work and time. In addition, as described above, the conventional tire information transmitters require a switching device or a lead terminal, and a circuit for triggering transmission and the like, thereby causing the system configuration to be complicated. This increases system cost.

Further, in both of the tire air pressure detection transmitter of PATENT DOCUMENT 1, and the transmitter of the tire condition monitoring apparatus of PATENT DOCUMENT 2, the operation mode is reversibly changed depending on the measured pressure value, which causes a problem in which configuration of, such as, control circuit tends to be complicated. This increases the system cost.

In the tire pressure monitoring system of PATENT DOCUMENT 3, the transmitting section starts the wireless transmission of the monitoring signal when the detected value exceeds a predetermined value after the system has been mounted on the wheel and the tire has been rimmed and filled with air. This involves a problem in which a failure of the system can only be detected after the tire has been filled with air. For example, in case that a system does not work due to manufacturing problems, operation failure, or shock during transport, in order to replace the system it is necessary to remove the tire that has already been assembled, requiring complicated processes.

SUMMARY

One embodiment of the present invention has been made to solve the aforementioned problems. Another embodiment of the present invention to provide a tire information transmitter that has a simple configuration, and is capable of easily acquiring useful information representing ambient information inside the tire, and a tire information acquisition system using the tire information transmitter.

Another embodiment of the present invention provides a tire information transmitter which is mounted to a tire cavity region surrounded by an inner peripheral surface of a tire and a wall surface of a wheel, and measures ambient information in the tire cavity region including at least pressure to wirelessly transmit to outside the tire cavity region, the tire information transmitter comprising:

a sensor unit having a pressure sensor for measuring a pressure in the tire cavity region;

a control unit for comparing a level of a pressure signal representing pressure measured by the sensor unit with a threshold value and for generating an operation signal indicating that the tire information transmitter is operating; and a transmitting unit for wirelessly transmitting the pressure signal or the operation signal; wherein, the control unit controls the transmitting of the transmitting unit and compares the level of the pressure signal with the threshold value continually after a supply of driving power is started, and has a comparing mode in which the transmitting unit transmits the operation signal at a first time interval, and a transmitting mode in which the transmitting unit transmits the pressure signal at a second time interval which is shorter than the first time interval, and once the level of the pressure signal exceeds the threshold value, as a result of the comparing, the control unit irreversibly shifts from the comparing mode to the transmitting mode.

Preferably, the sensor unit, the control unit and the transmitting unit are housed in a housing box and an outer surface of the housing box has a curved surface fitting on a bottom surface of the wheel so as to be attached to the bottom surface of the wheel.

Preferably, the tire information transmitter further comprises a battery for driving the sensor unit, the control unit and the transmitting unit, wherein the battery is replaceable and the control unit is operated in the comparing mode at a time when the battery is replaced.

Preferably, in the transmitting mode, a time interval for measuring the pressure by the sensor unit and the second time interval for transmitting the pressure signal are changed according to the level of the pressure signal.

Another embodiment of the present invention provides a tire information acquisition system comprising:

a tire information transmitter which is mounted to a tire cavity region surrounded by an inner peripheral surface of a tire and a wall surface of a wheel, and measures ambient information in the tire cavity region including at least pressure to wirelessly transmit to outside the tire cavity region, and a receiver which is mounted outside of the tire cavity region surrounded by the inner peripheral surface of the tire and the wall surface of the wheel, and receives a pressure signal from the tire information transmitter, the tire information transmitter comprising:

a sensor unit having a pressure sensor for measuring a pressure in the tire cavity region;

a control unit for comparing a level of a pressure signal representing pressure measured by the sensor unit with a threshold value and for generating an operation signal indicating that the tire information transmitter is operating; and a transmitting unit for wirelessly transmitting the pressure signal or the operation signal; wherein, the control unit controls the transmitting of the transmitting unit and compares the level of the pressure signal with the threshold value continually after a supply of driving power is started, and has a comparing mode in which the transmitting unit transmits the operation signal at a first time interval, and a transmitting mode in which the transmitting unit transmits the pressure signal at a second time interval which is shorter than the first time interval, and once the level of the pressure signal exceeds the threshold value, as a result of the comparing, the control unit irreversibly shifts from the comparing mode to the transmitting mode.

Preferably, the sensor unit, the control unit and the transmitting unit are housed in a housing box and an outer surface of the housing box has a curved surface fitting on a bottom surface of the wheel so as to be attached to the bottom surface of the wheel that is formed of a curved surface.

Preferably, the tire information transmitter further comprises a battery for driving the sensor unit, the control unit and the transmitting unit, wherein the battery is replaceable, and the control unit is operated in the comparing mode at a time when the battery is replaced.

Preferably, in the transmitting mode, a time interval for measuring the pressure by the sensor unit and the second time interval for transmitting the pressure signal are changed according to the level of the pressure signal.

Preferably, the receiver is mounted on a vehicle body to which the tire and the wheel are attached.

Accordingly, the tire information transmitter and the tire information acquisition system of the present invention allow the control unit to irreversibly shift, once the pressure signal level exceeds the threshold value, from the comparing mode in which the pressure signal level is compared with the threshold value level continually after the start of supplying the driving power, to the transmission mode in which the transmitting unit transmits the pressure signal at a predetermined time interval. As a result, the transmitting unit can transmit only significant and effective information of the ambient information in the tire cavity region that is obtained after the tire is inflated with air, rather than transmit less significant information, for example, the pressure information obtained with a tire in an initial stage, which is not inflated with air.

Further, the tire information transmitter and the tire information acquisition system of the present invention allow the transmitting unit to transmit an operation signal to outside even in the comparing mode, so that any tire information transmitter which is defective due to such as manufacturing problems, faulty operations, or shock during transport can be identified.

Further, the tire information transmitter and the tire information acquisition system of the present invention can eliminate the necessity of some components, such as the receiving circuit and the lead terminal of the prior art. This reduces system cost as well as system size.

Still further, the tire information transmitter and the tire information acquisition of the present invention ensure that the transmission of the pressure signal is reliably started by the transmitting unit, since the transmission of the pressure signal automatically starts, when the pressure signal level measured by the pressure sensor first exceeds the threshold value, thereby eliminating the necessity of a process for triggering the transmission of the pressure signal, that is necessary with the conventional system. This reduces work cost.

DETAILED DESCRIPTION OF EMBODIMENTS

Hereinafter, a tire information transmitter and a tire information acquisition system of the present invention will be described in detail based on a preferred embodiment shown in the accompanying drawings.

Figure 1:
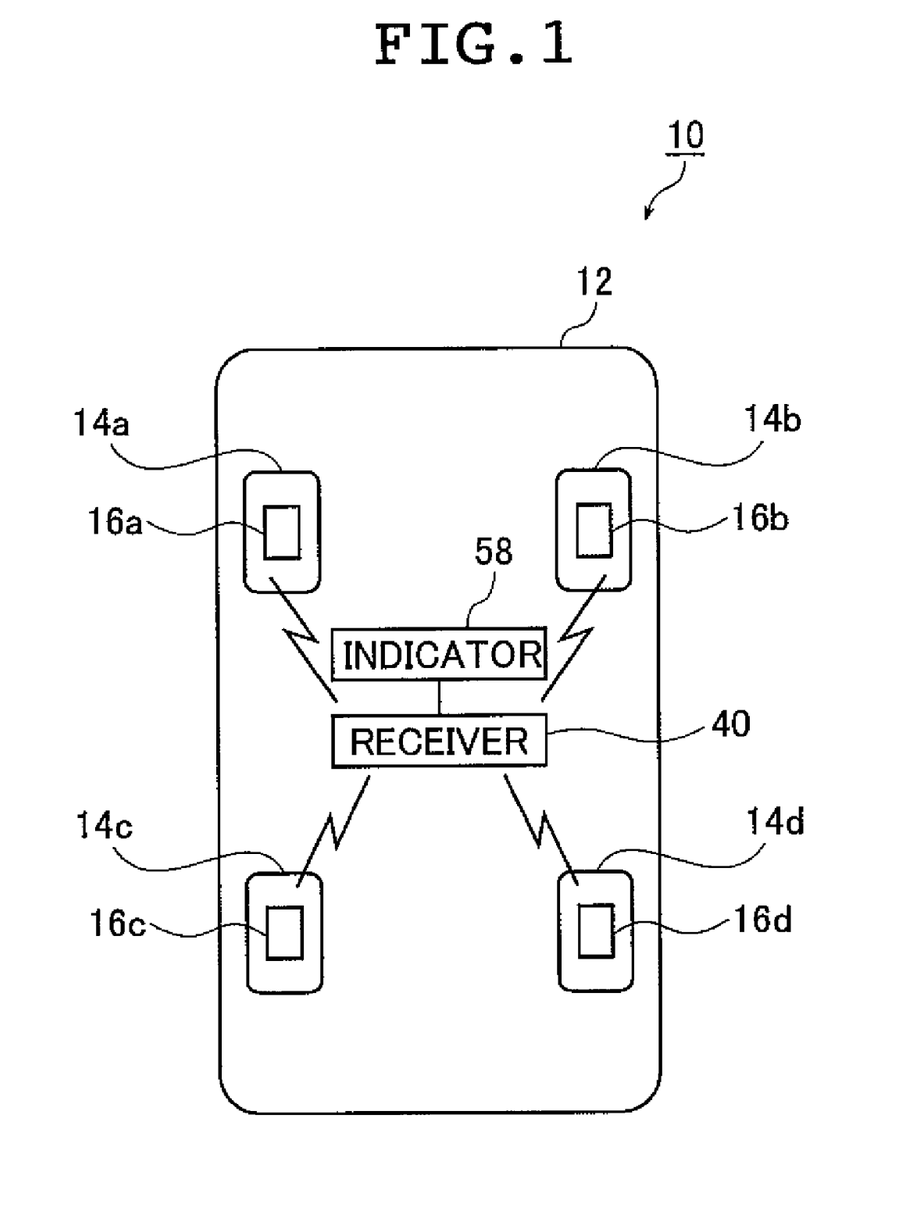
FIG. 1 is a schematic view of a tire information acquisition system using the tire information transmitter according to an embodiment of the present invention.

FIG. 1 is a schematic view of a tire information acquisition system using the tire information transmitter according to an embodiment of the present invention.

As shown in FIG. 1, wheel assemblies 14a-14f each having a tire and a wheel, are mounted to respective wheel mounting positions of a vehicle 12. A tire information acquisition system 10 of this embodiment is, for example, provided on a passenger car.

As shown in FIG. 1, the tire information acquisition system 10 of this embodiment includes tire information transmitters 16a-16d (hereinafter referred to as "tire transmitter(s)") mounted to respective wheel assemblies 14a-14f, a receiver 40 for receiving a transmission signal from the respective tire transmitters 16a-16d, and an indicator 58 for indicating, for example, tire inflation pressure and tire internal temperature based on the transmission signal from the respective tire transmitters 16a-16d.

Figure 2A:
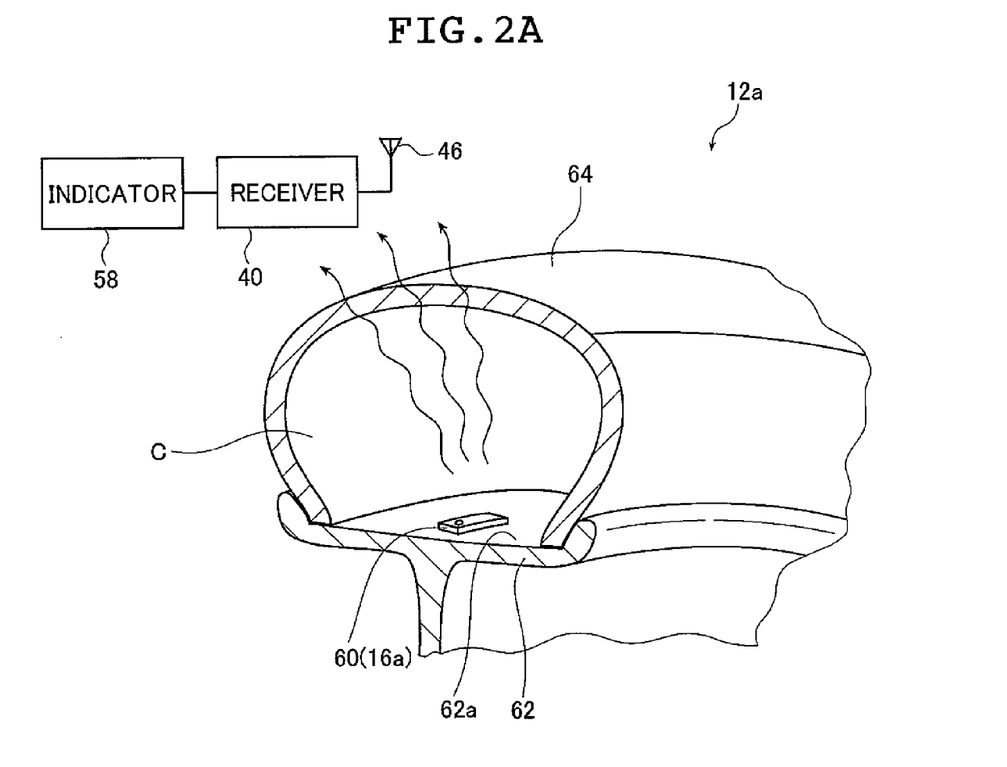
FIG. 2A is a schematic perspective view illustrating mounting status of the tire information transmitter of this embodiment which is mounted to a wheel assembly.
Figure 2B:
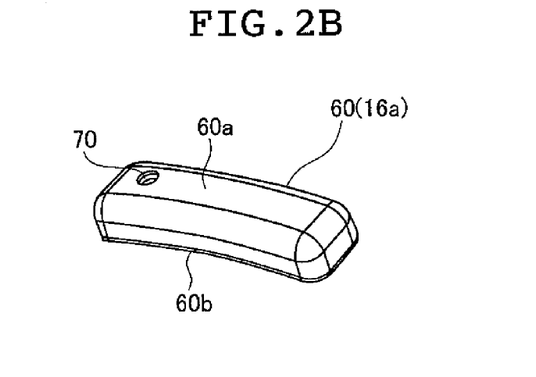
FIG. 2B is a perspective view illustrating an external appearance of the tire information transmitter of this embodiment.

FIG. 2A is a schematic perspective view illustrating mounting status of the tire information transmitter of this embodiment which is mounted to a wheel assembly and FIG. 2B is a perspective view illustrating an external appearance of the tire information transmitter of this embodiment.

For simplification of the description, the tire transmitters 16a-16d are represented by the tire transmitter 16a, and description on the remaining tire transmitters 16b-16d are omitted because the configuration is the same.

As shown in FIG. 2A, the tire transmitter 16a is housed in a housing box 60 which is rectangular shape. A bottom surface 60b of the housing box 60 has a curved surface so as to fit on a curved wheel bottom surface 62a (a rotating body surface having a predetermined curvature) facing a tire cavity region C surrounded by a tire inner peripheral surface and a wheel wall surface.

The tire transmitter 16a measures ambient information in the tire follow region C, including a tire inflation pressure representing a pressure inside the tire cavity region C, and a tire internal temperature representing a temperature inside the tire cavity region C, to wirelessly transmit to the receiver 40 provided outside the wheel assembly 12a.

In this embodiment, the tire transmitter 16a, while being housed in the housing box 60, is arranged on a wheel periphery around a wheel rotation axis, in the opposite side (180 degree) of the position where a wheel valve (not shown) is disposed, so as to prevent occurrence of vibrations due to unbalance of the wheel 62.

In addition, as shown in FIG. 2A, the housing box 60 (tire transmitter 16a) is mounted to a wheel bottom surface 62a of the wheel assembly 12a having a tire 64 and a wheel 62, in a manner that the housing box 60 fits along the wheel bottom surface 62a.

In an upper surface 60a of the housing box 60, a through hole 70 is formed. The through hole 70 is used for improving the measurement accuracy of a sensor unit 20 (see FIG. 3) that measures the tire inflation pressure and the tire internal temperature. The through hole 70 is provided in such a position that the sensor unit 20 faces the opening of the through hole 70.

Next, the respective tire transmitters 16a-16d will be described in detail. Since the transmitters 16a-16d have the same configuration, only the tire transmitter 16a is described as representative, and the description on the remaining tire transmitters 16b-16d are omitted.

Figure 3:
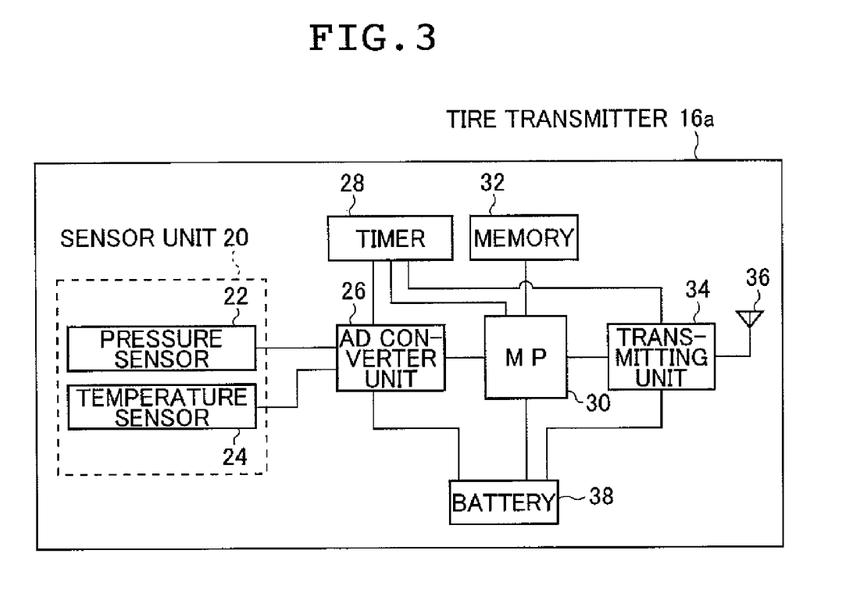
FIG. 3 is a schematic view illustrating the configuration of the tire information transmitter of this embodiment.

FIG. 3 is a schematic view illustrating the configuration of the tire information transmitter of this embodiment.

As shown in FIG. 3, the tire transmitter 16a generally includes a sensor unit 20, an AD converter unit 26, a timer 28, an MP (microprocessor) 30, a memory 32, a transmitting unit 34, a transmitting antenna 36 and a battery 38.

The sensor unit 20 is connected to the AD converter unit 26. The AD converter unit 26 is connected to the timer 28 and the battery 38. The MP 30 is connected to the AD converter unit 26, the timer 28, the memory 32 and the battery 38.

The transmitting unit 34 is connected to the timer 28, the MP 30, and the battery 38, and further the transmitting antenna 36 is connected to the transmitting unit 34.

The sensor unit 20 has a pressure sensor 22 and a temperature sensor 24 for measuring a tire inflation pressure and a tire internal temperature respectively, as ambient information inside the tire cavity region C. The sensor unit 20 outputs to the AD converter unit 26 a pressure signal obtained from the pressure sensor 22 corresponding to the tire inflation pressure, and a temperature signal obtained from the temperature sensor 24 corresponding to the tire internal temperature. As the sensor unit 20, at least a pressure sensor may be used in monitoring the air pressure of the tire.

The pressure sensor 22 measures the tire inflation pressure. The tire inflation pressure may be measured in terms of, for example, gage pressure, differential pressure, or absolute pressure. The pressure sensors that can be used as the pressure sensor 22 include, for example, a semiconductor pressure sensor and a capacitance type pressure sensor.

The temperature sensor 24 measures the temperature inside the tire cavity region C. The temperature sensors that can be used as the temperature sensor 24 include, for example, a semiconductor thermo-sensor and a resistance element thermo-sensor.

The AD converter unit 26 converts the pressure signal measured by the pressure sensor 22, and the temperature signal measured by the temperature sensor 24 into for example 8-bit digital signals, respectively. The pressure signal and the temperature signal each converted into digital signals (hereinafter referred to as "pressure data" and "temperature data" respectively) are supplied to the MP 30.

The memory 32 stores ID information (ID) of the tire transmitter 16a. The memory 32 also stores a threshold value $P_{th}$ at which the transmission of the transmission signal to outside is triggered (hereinafter alternatively referred to as "activated"). The memory 32 further stores a threshold value M which is used for changing the sampling interval in a subsequently described transmitting mode.

The timer 28 outputs timing signals at predetermined intervals to the AD converter unit 26, the MP 30, and the transmitting unit 34. The timer 28 controls the time interval for the sensor unit 20 to measure the ambient information, and the time interval of transmission of the operation signal and the transmission signal that will be described later. The timer 28 may either be composed of a dedicated circuit, or be programmed in the MP 30.

The timer 28, until the tire transmitter 16a starts to transmit the transmission signal to the receiver 40, outputs a timing signal to the AD converter unit 26 at an interval of, for example, one minute. Based on this timing signal, the AD converter unit 26 converts the pressure signal from analog to digital, so as to output to the MP 30. In other words, the tire transmitter 16a measures the pressure with a sampling period of one minute. Until the tire transmitter 16a starts the transmission of the transmission signal to the receiver 40, the timer 28 continues to output a signal at an interval of, for example, one-hour to allow the MP 30 to output the subsequently described operation signal at a predetermined interval.

On the other hand, the timer 28, as will be described later, receives a signal from the MP 30 if the pressure data level exceeds the threshold value $P_{th}$. Upon receiving the signal, the time interval for the timer 28 to output the timing signal to the AD converter unit 26 and the transmitting unit 34 is reduced. For example, the time interval of one minute is reduced to 30 seconds. Based on this timing signal, the AD converter unit 26 carries out the AD conversion of the pressure signal and the temperature signal. Also, the transmitting unit 34 carries out the transmission of the subsequently described transmission signal (including pressure data and temperature data), through the transmission antenna 36, at an interval of, for example, 30 seconds. In other words, the tire transmitter 16a measures the pressure and the temperature with a sampling period of 30 seconds and transmits the transmission signal to the receiver 40.

In addition, after the pressure data level has exceeded the threshold value $P_{th}$, and if the pressure level data is reduced below the threshold value M, the MP 30 outputs a signal to the timer 28. This further reduces the time interval of outputting the timing signals from the timer 28. For example, the time interval of 30 seconds is reduced to 15 seconds.

The MP 30 compares the pressure data which is supplied as a digital signal through AD conversion in the AD converter unit 26, with the threshold value for pressure data level which is retrieved from the memory 32.

As a result of the comparison, if the pressure data level exceeds the threshold value, identification information (ID) that enables the identification of the tire transmitter 16a from other tire transmitters 16b-16d and a WARD signal are retrieved from the memory 32. The transmission signal to be transmitted to the receiver 40 is generated including the identification information and the WARD signal, and outputted to the transmitting unit 34. The MP 30 generates a signal to the timer 28, based to the result of the comparison of the pressure data and the threshold value, so as to change the time interval for outputting the timing signal.

After the pressure data level has exceeded the threshold value $P_{th}$, and if the pressure data level reduced below the threshold value M, a signal is outputted to the timer 28, so that the time interval for outputting the timing signal is further reduced.

In addition to the above-described functions, the MP 30 manages the operation of each components of the tire transmitter 16a, and serves as a control unit in the practice of the present invention.

The MP 30 generates an operation signal which indicates that the tire transmitter 16a is operating. The MP 30 determines the tire transmitter 16a to be operational if it receives inputs from all of the connected AD converter unit 26, timer 28, memory 32, and battery 38. In this case, if an activating signal is supplied from the timer 28 to the MP 30 at a time interval of one hour, the MP 30 generates an operation signal to allow the transmitting unit 34 to transmit the operation signal to outside at a predetermined time interval. Therefore, if no operation signal is generated by the tire transmitter 16a, it is determined that the tire transmitter 16a is not operating normally, due to initial failure, or other failures.

The time interval for the operation signal to be outputted by the tire transmitter 16a (MP 30) is not limited to any specific value, so long as it is longer than the time interval for transmitting the pressure signal in the subsequently described transmission mode.

In this embodiment, the MP 30 has a comparing mode, in which the pressure data level acquired from the pressure sensor 22 is compared with the threshold value $P_{th}$, and the operation signal indicating that the tire transmitter 16a is operating is transmitted at a time interval of, for example, one hour. The MP 30 also has a transmission mode, in which, if the pressure data level acquired from the pressure sensor 22 exceeds the threshold value $P_{th}$, a transmission signal to be transmitted to the receiver 40 is generated and transmitted through the transmitting unit 34. The comparing mode to the transmission mode is an irreversible change, so that once the transmission mode is enabled, it is impossible to return back to the comparing mode. In the transmission mode, the operation signal is not outputted.

The transmission signal generated by the MP 30 contains the identification information (ID) of the transmitter and the WARD signal. The WARD signal carries the pressure data and the temperature data.

The threshold values stored in the memory 32 are preset according to the output characteristics of the pressure sensor 22.

In the practice of the present invention, the format for the transmission signal is exemplified by a format in which formatted signals are repeated. The ID and the WARD signal each can be represented by a specific number of bits of 0 and 1, which are sequentially arranged according to a certain rule. The WARD signal, for example, is represented by arranging 10 bits of 0, and then arranging 10 bits of 1, thus forming one block and repeating three such blocks.

The transmitting unit 34 has an oscillating circuit (not shown) for generating a carrier wave of, for example, 315 MHz, a modulator unit (not shown) for modulating the carrier wave corresponding to the transmission signal generated by the MP 30 to generate a high-frequency signal, and an amplifying circuit (not shown) for amplifying the high frequency signal. The carrier wave may be modulated according to any known mode such as an ASK (Amplitude shift keying) mode, an FSK (Frequency shift keying) mode, a PSK (Phase shift keying) mode, a multi-PSK mode such as QPSK or 8-PSK, or a multi-ASK mode such as 16QAM or 64QAM.

The transmission antenna 36 is configured for emitting an electric wave of, for example, 315 MHz toward the receiver 40.

The battery 38 supplies power for driving the AD converter unit 26, the MP 30, and the transmitting unit 34. A known battery such as CR-2032 (coin-shaped manganese dioxide-lithium battery) is employed as the battery 38.

In the tire transmitter 16a of the present invention, if a removable battery is used as the battery 38, the comparing mode is enabled again at the moment the battery is mounted. The power consumption necessary before transmitting the transmission signal (that is, in the comparing mode) is of, for example, a few hundreds of μA, and the power consumption necessary for transmitting the transmission signal (that is, in the transmission mode) is of a few hundreds of mA.

Figure 4:
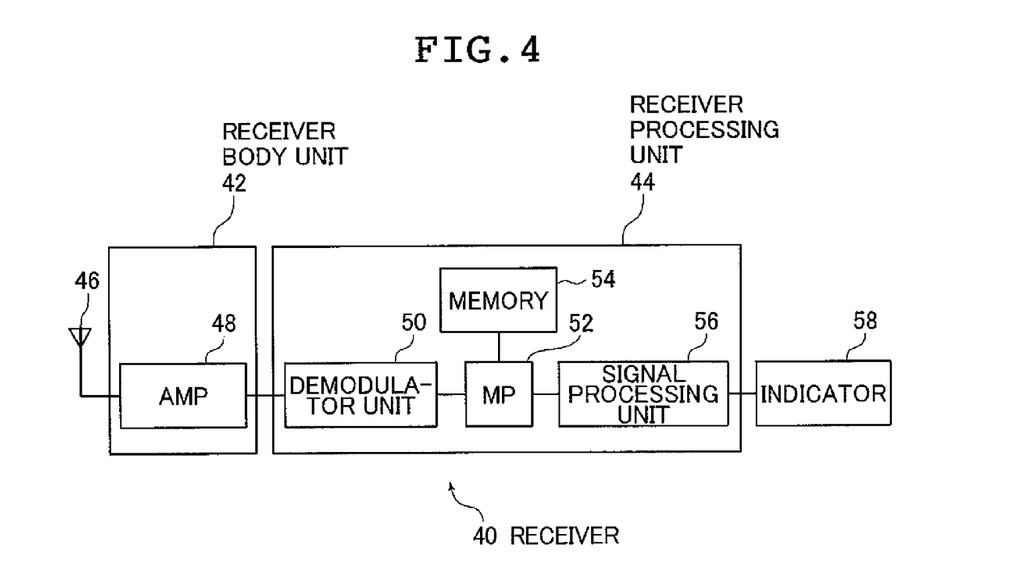
FIG. 4 is a schematic view illustrating the configuration of a receiver used in the tire information transmitting system of the example.

FIG. 4 is a schematic view illustrating the configuration of a receiver used in the tire information transmitting system of this embodiment.

The receiver 40 has a receiver body unit 42, and a receiver processing unit 44 connected by wire to the receiver body unit 42.

The receiver body unit 42 has an antenna device 46, and an amplifier circuit 48 (AMP). The receiver body unit 42 is arranged in the vicinity of the wheel assemblies 14a-14d to which the tire transmitters 16a-16d are mounted. For example, the receiver body unit 42 is mounted to a tire house on the side of the vehicle 12, and the receiver processing unit 44 is mounted to a central control unit (not shown) of the vehicle 12 body.

The antenna device 46 is configured to receive the high frequency signal (transmission signal) of, for example, 315 MHz transmitted by the tire transmitters 16a-16d.

The amplifier circuit 48 is configured by using such as FET (field-effect transistor), for amplifying the received high frequency signal to supply to the receiver processing unit 44.

The receiver body unit 44 has a demodulator unit 50 for demodulating the high frequency signal (transmission signal) supplied by the tire transmitters 16a-16d to generate the transmission signal, an MP 52, a memory 54, and a signal processing unit 56.

The demodulator unit 50 carries out known filtering process and code correction process to the filtered high-frequency signal (transmission signal) and finally generates the demodulated transmission signal. The demodulator unit 50 supplies the demodulated transmission signal to the MP 52.

Power supplies that can be used for driving the MP 52, demodulator unit 50, and signal processing unit 56 include, for example, the battery (not shown) of the vehicle 12. Alternatively, a battery built in the receiver body unit 20 may be used.

The memory 54 stores data for correlating the ID of the respective tire transmitters 16a-16d with the corresponding mounting positions. The memory 54 also stores a conversion table for converting the pressure data into a pressure value, and a conversion table for converting the temperature data into a temperature value.

The MP 52 acquires the ID, the pressure data, and the temperature data from the transmission signal supplied by the demodulator unit 50, refers to the conversion tables stored in the memory 54 to convert the pressure data into a pressure value, and the temperature data into a temperature value. The MP 52 also refers to the data for correlating the ID of the respective wheel assemblies 14a-14d with the corresponding mounting positions stored in the memory 54 so as to determine, from the acquired ID, which wheel assembly among the wheel assemblies 14a-14d is correlated with the pressure data and the temperature data.

In the signal processing unit 56 connected to the MP 52, the tire inflation pressure of, for example, the forward right wheel is compared with the predetermined value and determined and classified into three categories: "normal", "caution", and "warning", indicating the tire inflation pressure status. The result of the determination is supplied to the indicator 58 connected to the receiver processing unit 44.

The indicator 58 indicates the values of the tire inflation pressure and the tire internal temperature based on each mounting position in the vehicle. The indicator 58 displays the value and the determined status of the tire inflation pressure on, for example, an instrument panel of the vehicle 12.

Any indicators may be used as the indicator 58 so long as that can display at least the value of the tire inflation pressure on each mounting position in the vehicle basis. The signal processing unit 56 may carry out temperature compensation in which the pressure data is compensated using the supplied temperature data, and generate a signal indicating the temperature-compensated pressure data suitable for the indicator 58.

In this way, the receiver processing unit 44 demodulates, through the demodulator unit 50, the transmission signal from the high frequency signal, takes out the pressure data, the temperature data, and the ID, and determines, through the MP 52, which wheel assembly among the wheel assemblies 14a-14d the transmitted pressure and temperature data come from, by using the result of correlation of the ID of the respective wheel assemblies 14a-14d with the corresponding mounting positions stored in the memory 54. The tire inflation pressure is monitored, through the MP 52, based on the pressure data, according to the acquired mounting position information.

The tire information acquisition system 10 having the tire transmitters 16a-16d and the receiver 40 as configured as described above, irreversibly starts measuring of the pressure and the temperature, if the pressure value (pressure data) measured at the respective tire transmitters 16a-16d exceeds the threshold value. In this case, in order to acquire the pressure data and the temperature data at a frequency of, for example, one per 30 seconds, continually, the tire transmitters 16a-16d require a power supply capable of transmitting a few tens of mA for a few m seconds at a frequency of, for example, one per 30 seconds. Moreover, assuming that the power source is mounted in a tire cavity region C of the wheel assemblies 14a-14d that will not be unassembled unless the service life terminates, i.e., for instance, for about 10 years, each battery 38 is required to ensure reliable power supply to each component for a long period of time.

Hereinafter, the effect of the tire transmitter 16a of this embodiment is described. In the description, the tire transmitter 16a will be described as a representative, and the description on the remaining tire transmitters 16b-16d will be omitted.

Figure 5:
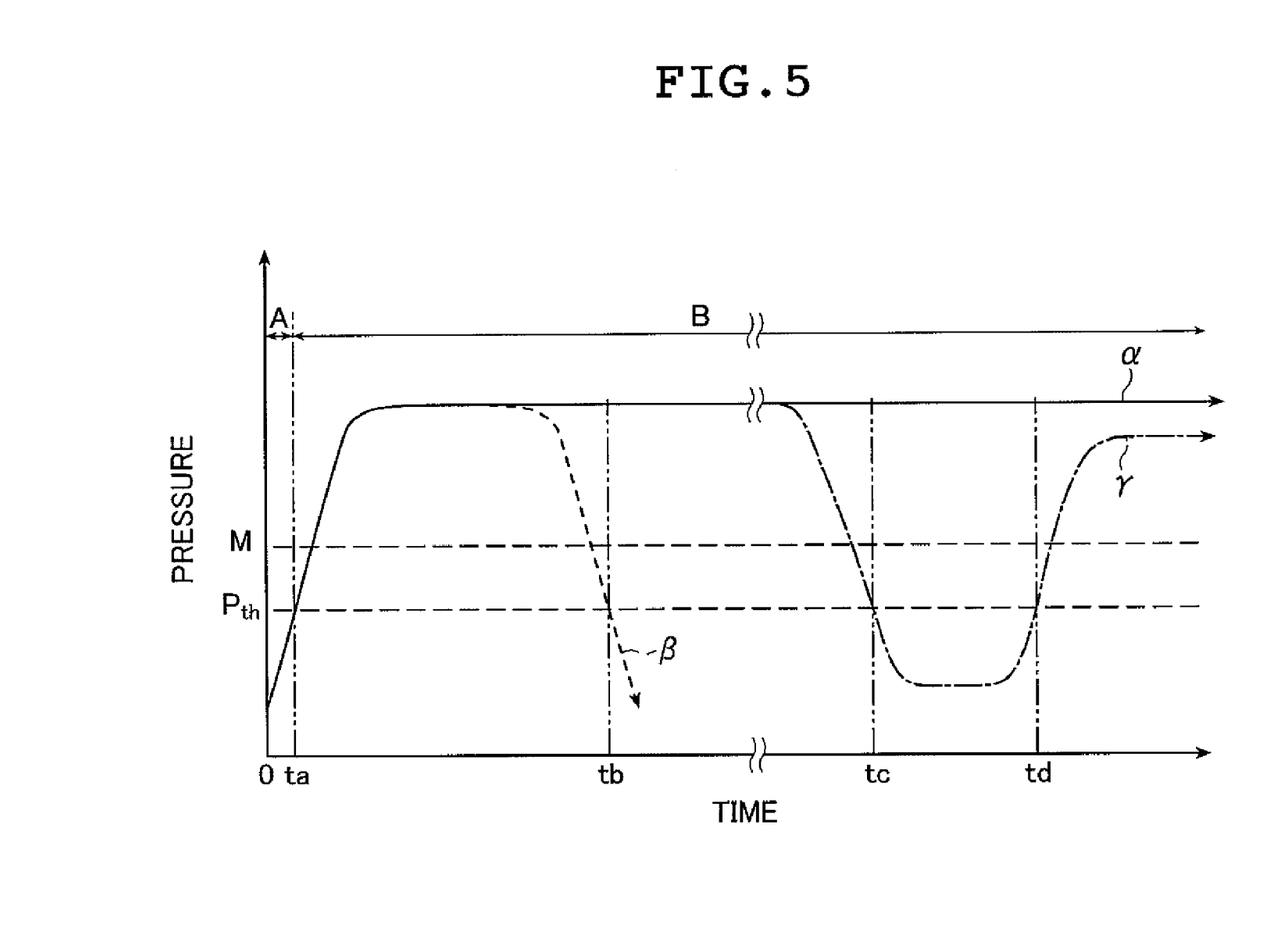
FIG. 5 is a graph illustrating a change in pressure in a tire cavity region with the passage of time, in which time is given on the horizontal axis and pressure is given on the vertical axis.

FIG. 5 is a graph illustrating a change in pressure in a tire cavity region with the passage of time, in which time is plotted on the horizontal axis and pressure is plotted on the vertical axis.

First, a tire transmitter 16a housed in a housing box 60 is mounted to a wheel bottom surface 62a of the wheel 62. At this moment, the tire transmitter 16a, to which a battery 38 is attached, is in a mode (comparing mode) in which the pressure is measured by the pressure sensor and an operation signal indicating the tire transmitter 16a is operating, is generated at an interval of, for example, one hour. In this comparing mode, the time interval for transmitting the operation signal is, for example, one hour.

A tire 64 is then mounted to the wheel 62. As a result, the tire transmitter 16a is provided in a tire cavity region C.

Then, the tire cavity region C is filled with air through a wheel valve (not shown).

As indicated by the curve α in FIG. 5, the pressure in the tire cavity region exceeds the threshold value $P_{th}$ at a time of $t_a$. In this case, up until the time of $t_a$, in the tire transmitter 16a, the pressure data is compared with the threshold value $P_{th}$ for pressure data stored in the memory 32 by MP 30, as well as the operation signal indicating that the tire transmitter 16a is operating is transmitted at an interval of, for example, one hour. This means, in the region A, the comparing mode is enabled.

In this embodiment, in the comparing mode, it is possible to determine that the tire transmitter 16a is in normal operation where the tire transmitter 16a is not affected by any defect that may be caused by manufacturing problems, faulty operation, or shock during transport. Accordingly, prior to assembling the tire to the wheel, only tire transmitters 16a that are capable of normal operation can be selected. This in turn eliminates some work including, for example, disassembling a tire that has been already assembled and inflated with air, for replacement.

On the other hand, if the pressure data level exceeds the threshold value $P_{th}$, the transmitting unit 34 starts to transmit the transmission signal including the ID, the pressure data, and the temperature data to the receiver 40 through the transmission antenna 36. That is, the enabled mode is shifted from the comparing mode to the transmission mode. In the region B, the transmission mode is enabled. At this stage, in the tire information acquisition system 10, the transmission signal is processed by the receiver 40 and the value of the tire inflation pressure, the status of the tire inflation pressure and the value of the tire internal temperature are displayed on the indicator 58. This allows the driver to recognize abnormality if any in the wheel assembly 14a.

In the transmission mode, the transmission signal is transmitted at an interval of, for example, 30 seconds. On the other hand, in the comparing mode, the pressure signal is detected at an interval of, for example, 1 minute.

As described above, in the practice of the present invention, the effective use of the air filling in assembling the wheel 12a to which the tire transmitter 16a is mounted, ensures that the tire transmitter 16a is reliably triggered (activated) to transmit the transmission signal.

As indicated by the curve β in FIG. 5, even if the pressure is below the threshold value $P_{th}$ at a time of $t_b$, the transmission of the transmission signal from the tire transmitter 16a is not stopped. The transmission of the transmission signal continues continually.

Further, as indicated by the curve β, if the pressure data is below the threshold value M in the transmission mode, it is assumed that abnormality exists in tire air pressure, such as blowout. As a result, as described above, the time interval for outputting the timing signal from the timer 28 is reduced, thereby reducing the time interval for detecting the pressure. In this case, in the tire information acquisition system 10, the transmission signal is processed by the receiver 40, and the value of the tire inflation pressure, the status of the tire inflation pressure, and the value of the tire internal temperature continue to be displayed on the indicator 58 continually. This allows the driver to recognize the abnormality in the wheel assembly 14a.

Further, as indicated by the curve γ in FIG. 5, even if the pressure is below the threshold value $P_{th}$ at a time of $t_c$, and then exceeds the threshold value $P_{th}$ at a time of $t_d$, the transmission of the transmission signal from the tire transmitter 16a is not stopped and continues continually.

In this case also, if the pressure is below the threshold value M, as described above, the time interval for the timing signal to be outputted from the timer 28 is reduced, thereby reducing the time interval for detecting the pressure.

At this stage, in the tire information acquisition system 10, the transmission signal is processed by the receiver 40, and the value of the tire inflation pressure, the status of the tire inflation pressure, and the value of the tire internal temperature continue to be displayed on the indicator 58 continually. This allows the driver to recognize the abnormality in the wheel assembly 14a.

Accordingly, the tire transmitter 16a of the present invention, while the value measured by the pressure sensor 22 is below the threshold value $P_{th}$, transmits through the transmitting unit 34 the operation signal that indicates the tire transmitter 16a is operating at an interval of, for example, one hour. It is not meaningful to measure a pressure with a tire transmitter 16a that is just mounted to a wheel 62, because the pressure to be obtained is substantially the same as the atomospheric pressure. In contrast, it is meaningful to know whether the tire transmitter 16a is capable of normal operation or not, though efforts should be used for suppressing the power consumption required therewith. In this embodiment, even prior to the tire is inflated with air, whether the tire transmitter 16a is in normal operation or not can be checked, and after the moment the tire is inflated, effective and significant pressure data can be obtained, such as inflation pressure change with the passage of time. In addition, the power consumption of the battery 38 can be suppressed as already described, allowing the extended service life.

In the tire transmitter 16a of this embodiment, once the threshold value $P_{th}$ is exceeded, even if the pressure in the tire cavity region C is below the threshold value $P_{th}$, the transmission of the transmission signal continues without stopping. In this case, the tire information acquisition system 10 is not stopped either.

In this embodiment, while the time interval for transmitting the operation signal is of, for example, one hour, the transmission by the pressure sensor 22 is started (activated) automatically if the measured pressure exceeds the threshold value. This means both processes, the air inflation process in the tire cavity region C and the activation process are carried out at the same time. This eliminates the activation process that may be necessary with the conventional system, and thereby reduces the work cost.

Still further, in this embodiment, the transmission of the transmission signal is triggered at the moment the pressure data level obtained by the pressure sensor exceeds the threshold value. This makes some components such as a receiving circuit and lead terminal to be unnecessary, achieving a simplified system configuration. Therefore, the system cost is reduced, while the system size is minimized.

The tire information transmitter and the tire information acquisition system of the present invention have been described hitherto in detail. As a matter of course, however, the present invention is not limited to the aforementioned embodiment and may be subjected to various modifications and changes as long as they do not depart from the spirit of the present invention.

What is claimed is:

1. A tire information transmitter comprising:
a sensor unit having a pressure sensor for measuring a pressure in a tire cavity region;
a control unit for comparing the measured pressure to a first threshold value and a second threshold value to generate i) an operation signal indicating that the tire information transmitter is operating after measurement of the pressure is started and until the measured pressure reaches the first threshold, and ii) a pressure signal representing the measured pressure after the measured pressure exceeds the first threshold; and
a transmitting unit for wirelessly transmitting the pressure signal or the operation signal;
wherein the control unit controls the transmitting unit in such a way that the transmitting unit transmits the operation signal after the measurement of the pressure is started and until the measured pressure reaches the first threshold, and controls the transmitting unit in such a way that the transmitting unit transmits the pressure signal and wherein the control unit further controls a frequency at which the transmitting unit transmits the pressure signal based upon whether the measured pressure falls below the second threshold value after the measured pressure exceeds the first threshold value; and
wherein the second threshold value is greater than the first threshold value.

2. The tire information transmitter of claim 1, wherein, after the measured pressure exceeds the first threshold, the transmitting unit transmits the pressure signal at a first frequency after the measured pressure exceeds the second threshold and thereafter when the measured pressure falls below the second threshold value and at a second frequency after the measured pressure exceeds the first threshold value and does not fall below the second threshold value, and wherein the first frequency is greater than the second frequency.

3. The tire information transmitter of claim 1, wherein the tire information transmitter is mounted to the tire cavity region surrounded by an inner peripheral surface of a tire and a wall surface of a wheel.

4. The tire information transmitter of claim 1, wherein the sensor unit, the control unit and the transmitting unit are housed in a housing box and an outer surface of the housing box has a curved surface fitting on a bottom surface of a wheel so as to be attached to the bottom surface of the wheel.

5. The tire information transmitter of claim 1, wherein the tire information transmitter further comprises a battery for driving the sensor unit, the control unit and the transmitting unit.

6. A tire information acquisition system comprising the tire information transmitter of claim 1, further comprising a receiver configured to receive the transmitted pressure signal from the tire information transmitter.

7. The tire information acquisition system of claim 6, wherein the receiver is mounted outside of the tire cavity region surrounded by a inner peripheral surface of a tire and a wall surface of a wheel.

8. The tire information transmitter of claim 1, wherein
the control unit controls the transmitting unit in such a way that the transmitting unit transmits the operation signal at a frequency less than the frequency at which the transmitting unit transmits the pressure signal,
a sampling frequency at which the pressure sensor measures the pressure when the operation signal is generated is less than the frequency at which the transmitting unit transmits the pressure signal and greater than the frequency at which the transmitting unit transmits the operation signal.

9. A method of monitoring a tire, comprising:
measuring a pressure in a tire cavity region;
comparing the measured pressure to a first threshold value and a second threshold value to generate i) an operation signal indicating that a tire information transmitter is operating after measurement of the pressure is started and until the measured pressure reaches the first threshold, and ii) a pressure signal representing the measured pressure after the measured pressure exceeds the first threshold;
wirelessly transmitting the generated pressure signal or the generated operation signal from the tire information transmitter; and
controlling a frequency of the transmitting at which the pressure signal is transmitted based upon whether the measured pressure falls below the second threshold value after the measured pressure exceeds the first threshold value and
wherein the second threshold value is greater than the first threshold value.

10. The method of claim 9, wherein, after the measured pressure exceeds the first threshold, said controlling step comprises controlling the frequency of the transmitting to be a first frequency after the measured pressure exceeds the second threshold and thereafter when the measured pressure falls below the second threshold value and at a second frequency after the measured pressure exceeds the first threshold value and does not fall below the second threshold value, and wherein the first frequency is greater than the second frequency.

11. The method of claim 9, further comprising receiving the transmitted pressure signal from the tire information transmitter.

12. The method of claim 9, wherein
the operation signal is transmitted at a frequency less than the frequency at which the pressure signal is transmitted,
a sampling frequency of the measured pressure in the measuring step when the operation signal is generated is less than the frequency of the transmitting at which the pressure signal is transmitted and greater than the frequency of the transmitting at which the operation signal is transmitted.

13. A tire information transmitter, comprising:
means for measuring a pressure in a tire cavity region;
means for comparing the measured pressure to a first threshold value and a second threshold value to generate i) an operation signal indicating that the tire information transmitter is operating after measurement of the pressure is started and until the measured pressure reaches the first threshold, and ii) a pressure signal representing the measured pressure after the measured pressure exceeds the first threshold;
means for wirelessly transmitting the pressure signal or the operation signal; and
means for controlling the transmitting means in such a way that the transmitting means transmits the operation signal after the measurement of the pressure is started and until the measured pressure reaches the first threshold, and controlling the transmitting means in such a way that the transmitting means transmits the pressure signal and wherein the controlling means further controls a frequency of the transmitting at which the transmitting means transmits the pressure signal based upon whether the measured pressure falls below the second threshold value after the measured pressure exceeds the first threshold value and wherein the second threshold value is greater than the first threshold value.

14. The tire information transmitter of claim 13, wherein, after the measured pressure exceeds the first threshold, the transmitting means transmits the pressure signal at a first frequency after the measured pressure exceeds the second threshold and thereafter when the measured pressure falls below the second threshold value and at a second frequency after the measured pressure exceeds the first threshold value and does not fall below the second threshold value, and wherein the first frequency is greater than the second frequency.

15. The tire information transmitter of claim 13, wherein the control means controls the transmitting means in such a way that the transmitting means transmits the operation signal at a frequency less than the frequency at which the transmitting means transmits the pressure signal, a sampling frequency at which the pressure sensor measures the pressure when the operation signal is generated is less than the frequency at which the transmitting means transmits the pressure signal and greater than the frequency at which the transmitting means transmits the operation signal.

* * * * *